United States Patent [19]

Blanchard et al.

[11] Patent Number: 5,452,765
[45] Date of Patent: Sep. 26, 1995

[54] GROUNDWATER RECOVERY SYSTEM

[75] Inventors: Charles E. Blanchard; John J. Mastroianni, both of Houston, Tex.

[73] Assignee: International Technology Corporation, Torrance, Calif.

[21] Appl. No.: 377,155

[22] Filed: Jan. 24, 1995

Related U.S. Application Data

[63] Continuation of Ser. No. 120,478, Sep. 13, 1993, Pat. No. 5,400,858.

[51] Int. Cl.⁶ .................................................. E21B 43/00
[52] U.S. Cl. ........................................... 166/370; 166/375
[58] Field of Search ............................... 166/313, 369, 166/370, 373, 375, 243, 265, 266, 268

[56] References Cited

U.S. PATENT DOCUMENTS

| | | | |
|---|---|---|---|
| Re. 33,102 | 10/1989 | Visser et al. ............................ | 166/267 |
| 233,714 | 10/1880 | Tichenor . | |
| 260,803 | 7/1882 | Tichenor ............................ | 166/370 X |
| 1,102,152 | 6/1914 | Jones .................................... | 166/267 X |
| 1,529,964 | 3/1925 | Proctor ................................ | 166/370 |
| 1,547,197 | 7/1925 | Arbon ................................. | 166/370 |
| 1,856,872 | 5/1932 | Kogan ............................... | 166/370 X |
| 4,183,407 | 1/1980 | Knopik .............................. | 166/370 |
| 4,323,122 | 4/1982 | Knopik .............................. | 166/267 |
| 4,345,647 | 8/1982 | Carmichael ....................... | 166/370 X |
| 4,544,037 | 10/1985 | Terry ................................. | 166/370 X |
| 4,886,119 | 12/1989 | Bernhardt et al. ................. | 166/370 X |
| 4,895,085 | 1/1990 | Chips .................................. | 110/346 |
| 5,018,576 | 5/1991 | Udell et al. ........................ | 166/272 |
| 5,050,676 | 9/1991 | Hess et al. ......................... | 166/267 |
| 5,076,360 | 12/1991 | Morrow ............................. | 166/267 |
| 5,111,883 | 5/1992 | Savery ............................... | 166/269 |
| 5,172,764 | 12/1992 | Hajali et al. ....................... | 166/267 |
| 5,180,013 | 1/1993 | Abdul ................................ | 166/370 |
| 5,220,958 | 6/1993 | Bernhardt ......................... | 166/67 |
| 5,383,747 | 1/1995 | Millan .............................. | 166/370 X |
| 5,400,858 | 3/1995 | Blanchard et al. ............... | 166/375 X |

OTHER PUBLICATIONS

Proceeding of the NWWA/API Conference On Petroleum Hydrocarbons and Organic Chemicals In Ground Water–Prevention, Detection and Restoration; Nov. 12–14, 1986 (Houston, Tex.).

Primary Examiner—Roger J. Schoeppel
Attorney, Agent, or Firm—Luedeka, Neely & Graham

[57] ABSTRACT

The specification discloses a system for recovering groundwater from a subterranean aquifer through an extraction well having a perforated casing extending down to the water table and a drop-tube within the casing to define an annular area between the casing and the drop-tube. A vacuum pump is connected to the drop-tube for inducing a flow of liquid up the tube. An aperture is provided through the wall of the drop-tube to enable gas from the annular area to enter the drop tube to mix with liquids flowing upwardly through the tube and reduce the density of the flowing fluid column so that it is more easily lifted to the surface. The aperture also provides a self-priming feature which avoids start-up problems associated with known vacuum dewatering methods.

6 Claims, 5 Drawing Sheets

GROUNDWATER RECOVERY SYSTEM

This is a continuation of application Ser. No. 08/120,478, filed Sep. 13, 1993 now U.S. Pat. No. 5,400,858.

FIELD OF THE INVENTION

This invention relates generally to the removal of groundwater from a subterranean formation by vacuum pumping, i.e., "vacuum, extraction" or "vacuum dewatering". More particularly, the present invention relates to a self-priming vacuum extraction system for removing groundwater from an aquifer at increased depths and with lower vacuum as compared with conventional systems.

BACKGROUND OF THE INVENTION

Aquifers are generally characterized within a subterranean formation as a water table at some level below the ground surface with a capillary fringe region of varying depth overlying the water table. A vadose zone or unsaturated area typically extends between the capillary fringe and the ground surface.

Aquifers which have become contaminated, such as by the presence of gasoline and other organic contaminants, are often remediated by removing the groundwater from the aquifer and stripping contaminants from the groundwater which is then returned to the aquifer substantially free of contaminants. Vacuum extraction is one way in which removal of groundwater may be accomplished.

A typical vacuum extraction system for groundwater removal uses a casing within the borehole which extends down into the water table a depth at least as great as the expected drawdown in the water table to ensure the presence of water within the casing for pumping. The casing contains perforations in the wall to promote flow communication between the formation and the casing so that liquids and gases from the formation may enter the casing. A drop-tube extends from the surface down to adjacent the lower end of the casing to define an annular area between the drop-tube and the casing.

The drop tube includes a lower end which is open to the formation below the water table and an upper end which is connected to a vacuum pump. The well is usually sealed at the surface as by a cement plug which is cast in-situ.

Application of a vacuum to the tube pulls water from the annular area into the lower end of the drop-tube for removal from the formation. Examples of such systems are described in Blake et al., "Vacuum Enhanced Hydrocarbon Recovery: A Case History" Proceedings of the NWWA Conference on Petroleum Hydrocarbons and Organic Chemicals in Groundwater - Prevention, Detection and restoration (Nov. 12–14, 1986), the disclosure of which is incorporated by reference.

Conventional vacuum extraction systems are of limited usefulness in applications where the depth to water exceeds about 33 feet since vacuum pumping cannot remove a column of water exceeding this height. Various configurations have been proposed to enable groundwater removal by vacuum from depths greater than 33 feet by creation of a two-phase flow, but these are limited in several respects, particularly in regards to start-up in that the systems are not "self-priming" and thus require complicated start-up procedures.

Accordingly it is an object of the present invention to provide an improved system for recovering groundwater.

Another object of the present invention is to provide an self-priming system for removing groundwater from a subterranean aquifer.

An additional object of the present invention is to provide a system of the character described which enables the removal of liquids with reduced vacuum as compared to conventional vacuum extraction wells.

It is another object of the present invention to provide a system of the character described which enables liquids to be removed from depths below about 33 feet.

Yet another object of the present invention is to provide a system of the character described which provides a flowing column of a liquid/gas mixture from start-up to avoid the need for priming.

Yet another object of the present invention is to provide a system of the character described which overcomes disadvantages of prior art vacuum extraction systems.

Still another object of the present invention is to provide a system of the character described which is uncomplicated in configuration and economical to operate.

SUMMARY OF THE INVENTION

Having regard to the foregoing and other objects, the present invention is directed to a vacuum well and associated method for removing fluids from a subterranean formation having an aquifer including a water table spaced below the ground surface and a vadose zone extending between the water table and the ground surface and having gases therein. In a preferred embodiment, the well includes a well casing extending downwardly from the ground surface to a location below the water table, the well casing including perforations which are permeable to liquids and gases present in the formation and being positioned so that the perforations bridge between the portion of the formation containing the water table and the vadose zone so that liquids from the water table and gases from the vadose zone may enter said casing by means of flow into the casing through the perforations to establish a liquid level within the casing, with the area above the liquid level in the casing being occupied by gas. An elongate drop-tube is positioned within the well casing to define an elongate annular area between the well casing and the drop-tube for containing liquids and gases which pass through the perforations of the well casing. The tube includes an upper end adjacent the ground surface and a lower end within the casing and spaced from the upper end by a substantially continuous cylindrical wall which is substantially impermeable to fluid flow therethrough. The lower end of the tube includes an opening positioned adjacent the liquid level and in fluid flow communication with liquids in the annular area. A vacuum pump is connected in flow communication with the upper end of the tube for supplying a vacuum through the tube to the lower end of the tube for inducing a flow of fluid from the annular area into the drop-tube through the opening wherein the flow establishes a flowing column of fluid up the tube toward the upper end. At least one aperture is provided in the wall of the drop-tube to provide flow communication between the tube and fluid in the annular area, the aperture being dimensioned and spaced above the opening in the lower end of the drop-tube to provide a flow of gas from the annular area into the tube through the aperture to mix gas with the column of fluid flowing up the drop-tube from the opening, providing a gas/liquid column in the tube flowing upwardly from adjacent the location of the aperture up to the upper end, wherein the flowing gas/liquid column is of a substantially reduced density as compared to the density of the flowing fluid column flowing up the drop-tube from the opening in the lower end of the drop-tube to enable the establishment of a substantially continuous flow of fluid from the formation through the drop-tube to the upper end thereof without the need for priming the well and to enable withdrawal of liquid from the formation with reduced vacuum as compared to conventional vacuum extraction wells.

The provision of the aperture in the cylindrical wall of the drop-tube is a particularly advantageous feature of the present invention which enables the removal of liquids from depths below about 33 feet in a manner which avoids the need for a separate priming procedure to initiate flow to the surface. In addition, the provision of a aperture enables the removal of liquids with reduced vacuum as compared to conventional vacuum wells. Accordingly, it will be appreciated that the system of the present invention enables the recovery of groundwater with reduced equipment and operating costs as compared to conventional systems.

These and other features and advantages of the invention will now be further described in the following specification with reference to the accompanying drawings in which:

DETAILED DESCRIPTION OF PREFERRED EMBODIMENTS

Figure 1:
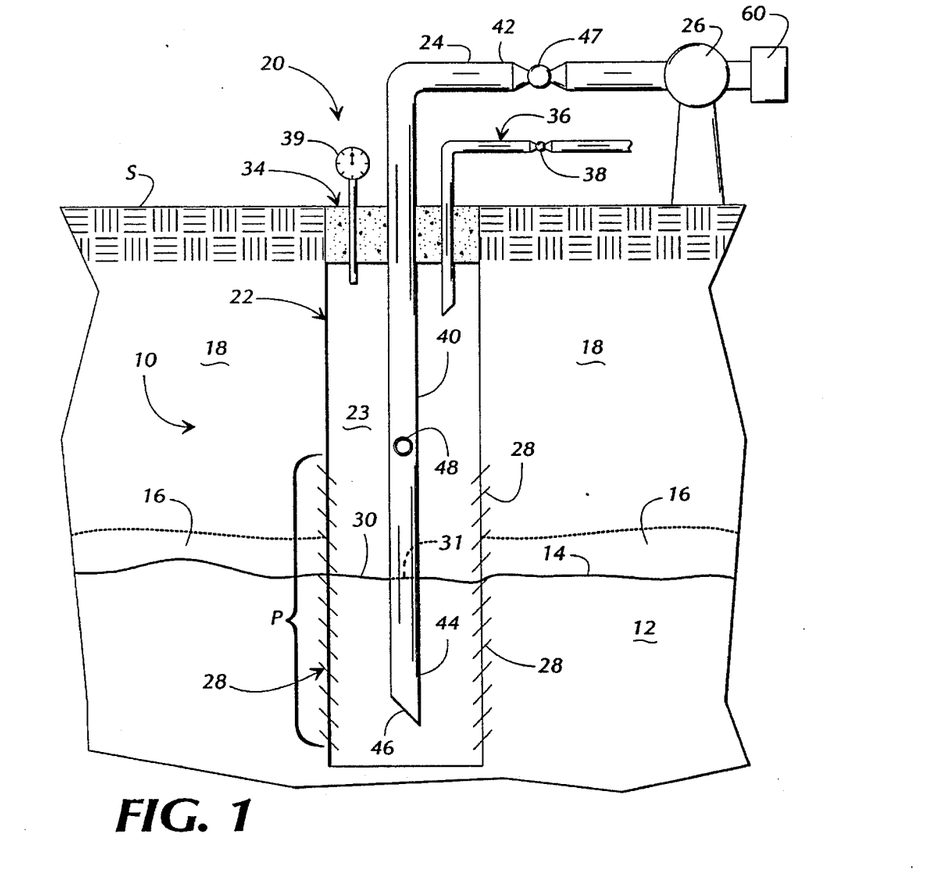
FIG. 1 is a diagrammatic view illustrating various features of the present invention for removing liquids from a subterranean formation.

With reference now to the drawings in further detail wherein the reference characters designate like or similar parts throughout the several views, the more general features of the invention are illustrated in the diagrammatic view of FIG. 1 wherein a subterranean formation generally indicated at 10 and includes an aquifer 12 having a water table 14. A capillary fringe region 16 of varying depth may overlie the water table 14 and a vadose zone or unsaturated area 18 extends between the capillary fringe region 16 and the ground surface S. The above lithology description and that shown in the drawing is only provided as an example, as the configuration of various portions of the formation may vary widely from site to site.

As used herein, the term "aquifer" refers generally to a water bearing stratum of permeable rock, sand or gravel or mixtures thereof and the term "water table" generally refers to the water-saturated area of the aquifer and, in particular, the upper level of the water-saturated zone, it being understood that the water level may naturally experience gradual changes or fluctuations due to seasonal influences and the like.

It is understood that the aquifer may be contaminated by the presence of organic compounds distributed therein among the various portions of the aquifer. Thus, the organic contaminants may be present as a floating film on the water table and it will be understood that reference to the position of the intake of the well for removal of liquids from the aquifer includes positioning the intake adjacent liquid organic contaminants on or in the water in the formation to effect removal of the same. For example, where organic contaminants are present as a floating film on the water table, it is preferred to achieve a position of the intake of the well adjacent the film during steady-state operation of the system; e.g., once drawdown of the water table is accomplished. Also, organic contaminants may be present in liquid or gas form in the capillary fringe or the vadose zone and it is contemplated that removal of contaminant in these areas in liquid and gas form may be accomplished using the present invention and that the removal of such contaminants will include the removal of a significant amount of groundwater and formation gases.

Exemplary organic contaminants which may be encountered in use of the invention include gasoline, diesel fuel and other petroleum-derived compounds as well as a wide range of saturated and unsaturated hydrocarbons substituted and unsubstituted with various halogens; e.g., carbon tetrachloride, benzene and toluene, to name a few; and any other liquid contaminant capable of removal from the formation by the present invention.

In accordance with the invention and with further reference to FIG. 1, liquids, primarily groundwater and organic contaminants adjacent the water table, may be extracted from the formation by use of a self-priming extraction well 20 having a well casing 22 in a borehole extending downwardly from the ground surface S to a location below the water table 14, an elongate vacuum drop-tube 24 of somewhat smaller diameter than that of the casing 22 substantially longitudinally aligned with and positioned within the well casing 22 to define an elongate annular area 23 therebetween extending from adjacent the ground surface S to the surface of water within the casing. A surface-mounted vacuum pump 26 is connected in flow communication with the interior of the drop-tube 24. As used herein, the term "self-priming" refers to a feature of the well wherein once the well is installed, the well may be put into operation to withdraw fluids from the formation simply by applying a vacuum to the well and without the need to initiate a separate priming procedure.

With continuing reference to FIG. 1, the well casing 22 includes a plurality of perforations 28 provided therethrough which are permeable to liquids and gases present in the formation 10. In a preferred embodiment, the casing 22 is positioned so that the perforations 28 provide a zone P of continuous permeability which bridges between the portion of the formation 10 containing the water table 14 and the vadose zone 18. Thus, liquids from the water table 14 and gases from the fringe region 16 and vadose zone 18 may pass into the casing 22 through the perforations 28 to establish a liquid level 30 within the casing 22 and a liquid level 31 in the drop-tube which initially correspond to natural level of the water table 14 in the formation, wherein the portion of annular area 23 which is above the liquid level 30 in the casing 22 is occupied by gas from the formation. Thus, the annular area 23 may contain liquid between the well casing 22 and the drop-tube 24 up to the surface of the water and gases thereabove. The construction aspects of well casings are well known and suitable constructions are those such as described in a publication entitled "Proceedings of the NWWA/API Conference on Petroleum Hydrocarbons and Organic Chemicals in Ground Water - Prevention, Detection and Restoration" (1984) and published by National Well Water Association, 637 Riverside Drive, Dublin, Ohio 43017, the disclosure of which is incorporated herein by reference.

A seal, such as a concrete seal 34 is preferably provided at the top of the well casing to seal the annular area from the atmosphere so that liquids and gases are prevented from entering or escaping the annular area through the top of the casing. A vent conduit 36 may extend through the seal 34 in flow communication with the annular area 23 to releasably seal the annular area from flow communication with the atmosphere above the ground surface. The vent conduit 36 includes a vacuum relief valve 38 which may be manually or otherwise opened to provide a flow of gas from the atmosphere into the annular area 23 to normalize the annular area to a preselected pressure; e.g., atmospheric, if desired. In a preferred embodiment, the pressure in the annular area is maintained slightly below atmospheric pressure. The pressure in the annular area may be monitored, as by use of a pressure gauge 39 extending through the seal to the annular area 23.

The drop-tube 24 is preferably provided by a substantially continuous cylindrical wall 40, an upper end 42 and a lower end 44. The wall 40 is substantially impermeable to fluid flow therethrough and the upper end 42 and the lower end 44 are spaced apart from one another by the cylindrical wall 40 of the drop-tube 24. The lower end 44 of the drop-tube 24 includes an opening 46 positioned below the liquid level 30 for providing fluid flow communication between the tube and fluids in the annular area 32. The opening 46 is preferably provided by a slant cut at an angle of about 45° with respect to the longitudinal axis of the tube 24. In this manner, the water level need not drop completely below the tube before gas-flow communication is established between the inside of the tube and the gas above the water in the annular area 23.

The vacuum pump 26 is in flow communication with the upper end 42 of the drop-tube 24 by suitable connections for supplying a vacuum through the interior of the drop-tube 24 to the lower end 44. A valve 47 is preferably provided between the upper end 44 and the pump 26 to facilitate regulation of the pressure applied to the drop-tube 24. An air inlet port or aperture 48 is provided in the cylindrical wall 40 of the drop-tube 24 to provide flow communication between the annular area 32 and the interior of the drop tube 24.

The provision of the aperture 48 in the cylindrical wall 40 of the drop-tube 24 is a feature of the present invention which enables the removal of liquids from depths below about 33 feet and the removal of liquids with reduced vacuum as compared to conventional vacuum wells. The aperture 48 also enables the establishment of a substantially continuous flow of liquid from the formation through the drop-tube 24 without the need for priming the well. To provide these and other advantages, the aperture 48 is dimensioned and positioned relative to the opening 46 in the lower end 44 of the drop-tube 24 so that a flow of gas may be established through the aperture 48 from the annular area 23 into the interior of the drop-tube 24 during operation of the system. The gas entering the aperture 48 mixes with water moving up the tube from the opening 46 to provide a fluid within the tube 24 having a reduced density as compared with the fluid moving up the tube to the aperture 48 and which is more easily lifted to the surface by the vacuum pump 26.

In a preferred embodiment, the aperture 48 is a substantially circular opening having a dimension and being positioned relative to the opening 46 so that during operation of the system, the liquid level in the annular area may be decreased to about the position of the opening 46 in the lower end of the tube 24. It will be understood that during at least the portion of this drawdown prior to the level of liquid reaching the tube opening 46, gas enters the aperture 48 and mixes with liquid flowing therein up the tube 24 to reduce the column density in the fluid in the tube above the position of the aperture 48. Once drawdown of liquid to the opening 46 is achieved, both liquid and gas will enter through the opening 46 from the annular area 23 so that the resulting column of fluid in the tube 24 has a density which is considerably less than a column of liquid and is thus more easily lifted upwardly through the tube.

Figure 2A:
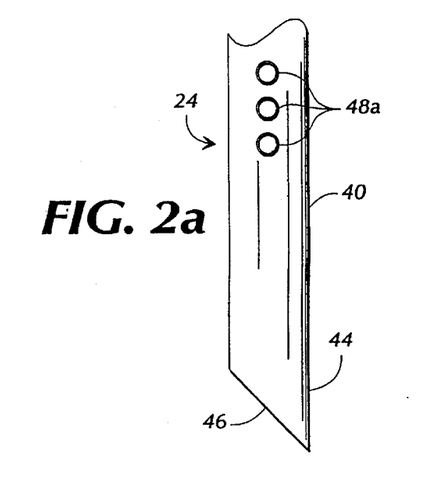
FIG. 2a is a detailed view of a drop-tube having a plurality of apertures and FIG. 2b is a detailed view of a drop-tube having a slit.
Figure 2B:
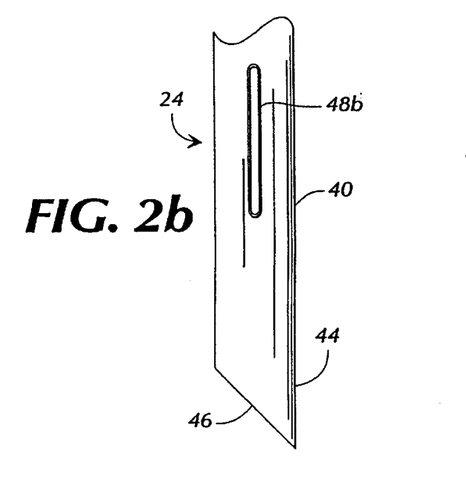

Accordingly, it will be understood that the dimension and position of the aperture 48 is subject to variations depending on a number of variables such as well depth, the position of the water table, vacuum pump capacity, drop-tube diameter, formation characteristics such as permeability, recharge rate, and the like. In this regard it will be further noted that the aperture 48 may be shapes other than circular and there may be a plurality of apertures 48a (FIG. 2a) or the aperture may be provided by an elongate slit 48b (FIG. 2b) on the wall 34 of the drop-tube 24.

In addition, it will be understood that some latitude may exist with respect to the dimension and position of the aperture between values for these parameters which are sufficient to enable operation of the system versus values which enable optimum or near optimum operation of the system in terms of reduced vacuum requirements and the like.

For example, it is believed that the system of the present invention may be used to remove liquids from below 33 feet and/or to remove liquids without the need to initiate a separate priming step and/or to accomplish removal of liquids from a subterranean formation with reduced vacuum requirements by providing an extraction well in accordance with the present invention wherein the aperture is located just slightly above the normal water level but no more than about 33 feet above the opening 46, preferably no more than about 25 feet due to practical limitations of most pumps. It has been discovered, however, that the aperture 48 may be placed below the initial water table when the formation has a relatively low permeability. In this instance, the low permeability prevents the formation from recharging the annular area with fluids at a rate greater than that of the fluid removal using drop-tube 24 so that it is assured that the aperture will be exposed to the gas in the annular area during drawdown.

As explained below, it is desirable to practice the present invention under conditions which result in a removal rate which is greater than the natural recharge rate of the aquifer. Thus, it is preferred to dimension and position the aperture 48 to maximize the flow rate of liquids in the drop-tube. Typically, unless the formation is a very low permeability formation, the maximum rate of removal of liquids from the formation (i.e. the rate of removal at maximum velocity) will be at least slightly greater than the rate that liquids are naturally replenished to the formation.

Figure 3:
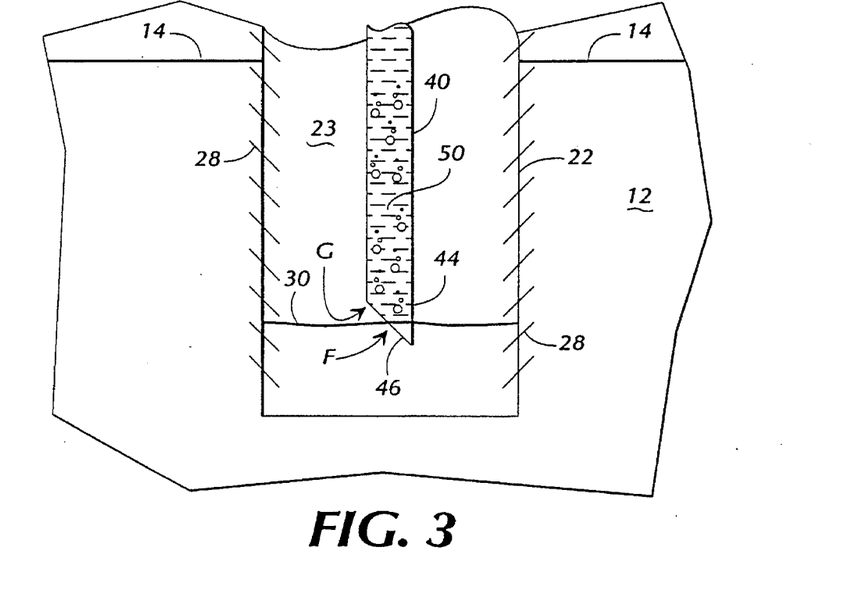
FIG. 3 is a detailed view of the drop-tube of FIG. 1 shown during steady-state operation of the system.

In the typical situation, where the liquid removal rate is greater than the rate of replenishment, the water level in the annular area will be drawn down during initial operation of the system until steady-state conditions exist where the water level 30 in the annular area 32 substantially corresponds to the level of the opening at the lower end of the drop-tube 24, as shown in FIG. 3. At this point, both liquids F and formation gases G enter the drop-tube 24 through the opening 40 so that a flowing column of fluid 50 which contains both liquids and gases (and thus has a density which is less than that of a substantially liquid-only column and is thus more easily removed) is provided in the lower end of the drop-tube moving up toward the aperture 48 where additional gas enters the tube 24 to further reduce the density of the fluid mixture.

Figure 4:
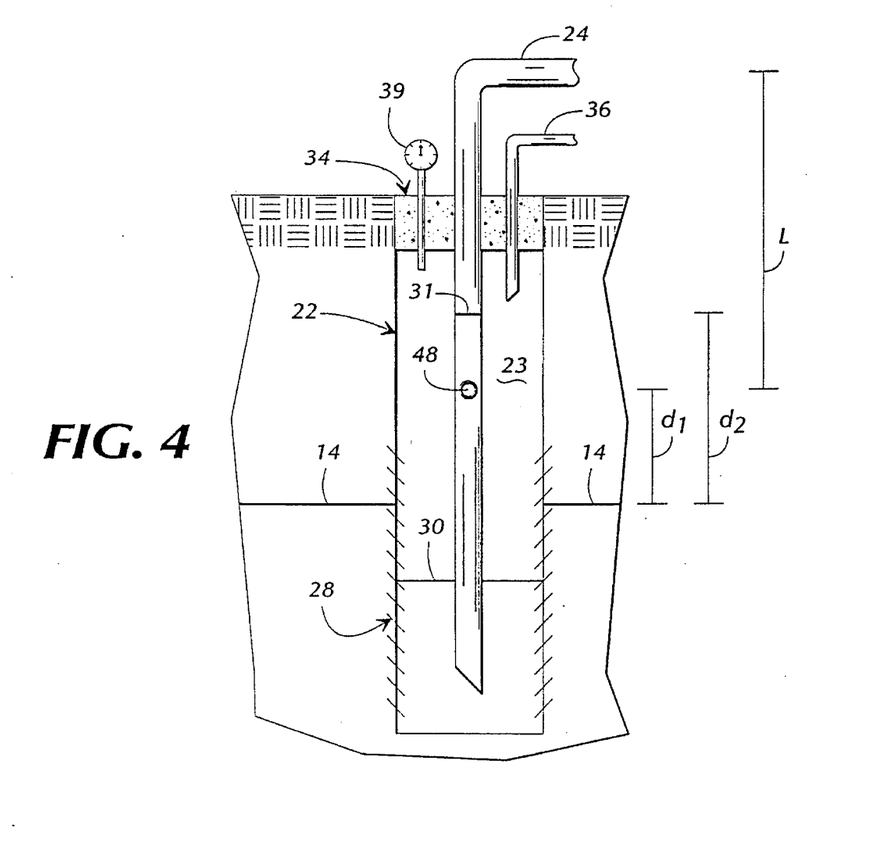
FIG. 4 is a diagrammatic view of the system showing parameters of the system involved in Equations 1 and 2.

In this regard, and with reference to FIG. 4, the maximum liquid velocity ($V_1$) in the drop-tube may be determined in accordance with equation 1 and the flow of gas through the aperture ($V_o$) may be determined in accordance with equation 2. From these parameters, a preferential dimension and position of the aperture may be obtained, as explained more fully below. The nomenclature for the foregoing is set forth in Table 1. Equation 1 is set forth in *Perry's Chemical Engineer's Handbook* (6th ed. 1984) and equation 2 is set forth in Stenning and Martin, *An Analytical and Experimental Study of Airlift Performance*, pp 106–110 (1986), the disclosures of which are incorporated herein by reference.

$$V_1^2 = \frac{2gL(H/L - 1/[1 + Q_g/SQ_1])}{(K+1) + (K+2)Q_g/Q_1} \quad \text{Equation 1}$$

$$\text{Where: } S = 1.2 + 0.2\, Q_g/Q_1 + \frac{0.35\,(gD)^{1/2}}{V_1}$$

$$K = \frac{4fL}{d}$$

$$Q_1 = V_1 A$$

$$P_o = P_A\, d_1/d_2$$

$$H = P_{ATH} - P_o$$

$$d_2 = \frac{P_{ATH} - P_A}{rho_w}$$

$$V_o = C\,(2g_o((P_i - P_o) \div rho_{aq}))^{1/2} \quad \text{Equation 2}$$

$$Q_g = A_p V_o$$

TABLE 1

| | |
|---|---|
| $A_p =$ | Area of aperture 48 |
| $V_o =$ | gas velocity through the aperture |
| $g_o =$ | dimensional constant |
| $P_i =$ | inlet pressure (absolute), i.e pressure in annular area |
| $P_o =$ | outlet pressure (absolute) i.e. pressure in the drop-tube 24 |
| $rho_a =$ | air density |

TABLE 1-continued

| | |
|---|---|
| $C =$ | discharge coefficient - typically between about 0.65 and 0.75 |
| $P_A =$ | applied vacuum (absolute) |
| $rho_w =$ | water density |
| $P_{ATM} =$ | atmospheric pressure |
| $d_1 =$ | distance from the water level in the annular area to the aperture 48 |
| $d_2 =$ | distance from the water level in the annular area to the water level in the drop-tube. This is a hypothetical value in relation to the system of the present invention, since this parameter represents the maximum height that a column of liquid could be drawn by a particular vacuum applied to a drop-tube arrangement which does not include an aperture. |
| $A =$ | drop-tube cross-sectional area |
| $D =$ | drop-tube diameter |
| $f =$ | friction factor (typically between about 0.004 and 0.009) |
| $g =$ | gravity |
| $K =$ | loss coefficient |
| $Q =$ | volume flowrate |
| $Q_g =$ | gas volume flowrate through the aperture 48 |
| $Q_1 =$ | liquid volume flowrate in the drop-tube |
| $\delta =$ | slip ratio |
| $V_1 =$ | liquid velocity in the drop-tube |
| $H =$ | Applied vacuum in feet of water at the aperture |
| $L =$ | distance in feet from the aperture of the centerline of the flow at the top of the drop-tube |

As mentioned previously, the aperture may be located at or just slightly above the normal water level in most situations. Accordingly, a $d_1$ value of zero is typically selected for use in Equation 1 to obtain $V_1$. This value of $V_1$ may then be used to determine the parameters set forth in Equation 2 to determine the appropriate dimension of the aperture. In this regard, it is noted that Equation 2 relates to a circular aperture. It will be understood that the value determined may be determined for apertures of other configurations utilizing appropriate orifice flow equations well known to the art. Further calculations may be accomplished if desired by solving Equation 1 for $d_1$ once $V_1$ has been determined, and then again recalculating $V_1$ with the new value.

Because of the complexity of the foregoing algorithms, the calculations are preferably performed by use of a computer wherein the results are output in the form of a graph of $Q_1$ versus $Q_g$ for a constant location L of the aperture 46. An example of such a graph is shown in FIG. 5 for a value of L of 40 feet, a 1.25 inch diameter drop-tube and an applied vacuum H at the aperture of 16.7 feet of water.

Figure 5:
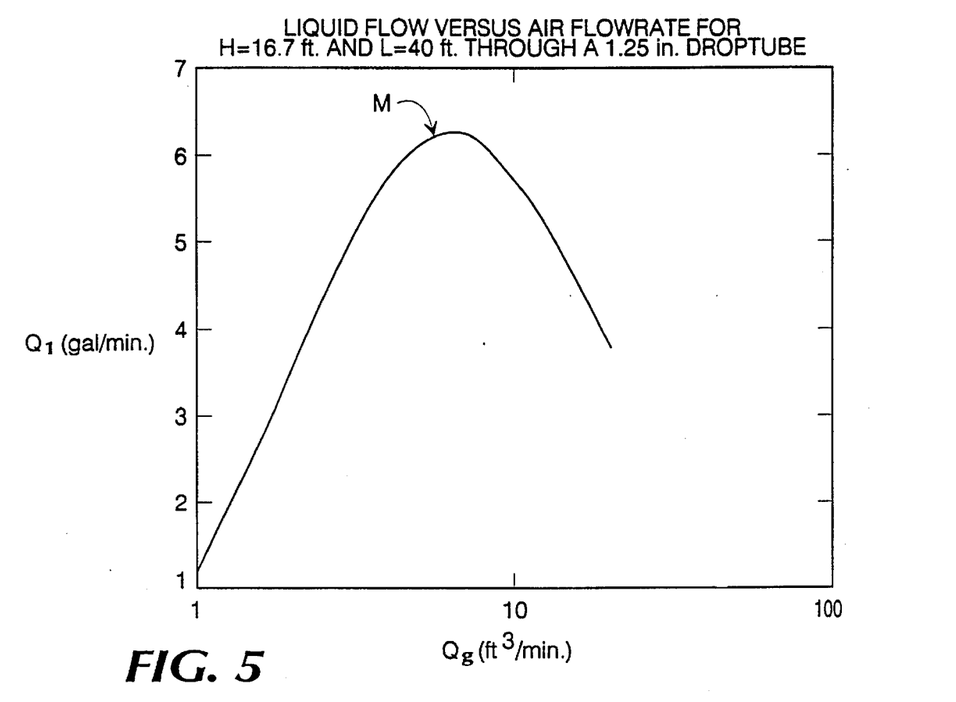
FIG. 5 is a graph of liquid flow rate ($Q_l$) versus gas flow rate ($Q_g$) for a given distance (L) between the upper end of the drop-tube and an aperture in the tube.

With reference to FIG. 5, it is preferred to select the maximum point on the graph and then determine the values for $Q_1$ and $Q_g$ at this point. For example, point M represents the apex of the curve of the graph. At point M, $Q_1$ is about 6.5 gal/min and $Q_g$ is about 7 ft³/min. To provide this volume of flow, a circular aperture having a diameter of about 0.15 inches may be used.

A sample calculation to determine the diameter is as follows:

$Q_g = 7 \text{ ft}_3/\text{min}$    $P_i = 14.7 \text{ lb/in}_2$ $P_o = 7.35 \text{ lb/in}_2$    $rho_a = 0.07 \text{ lb/in}_2$ $$A_p = \frac{Q_g}{\left(2g\left(\frac{P_i - P_o}{rho_a}\right)\right)^{1/2}}$$

$A_p = 0.017 \text{ in}_2$    $D = 2(A_p/\pi)^{1/2}$ $D = 0.147 \text{ inch}$

Figure 6:
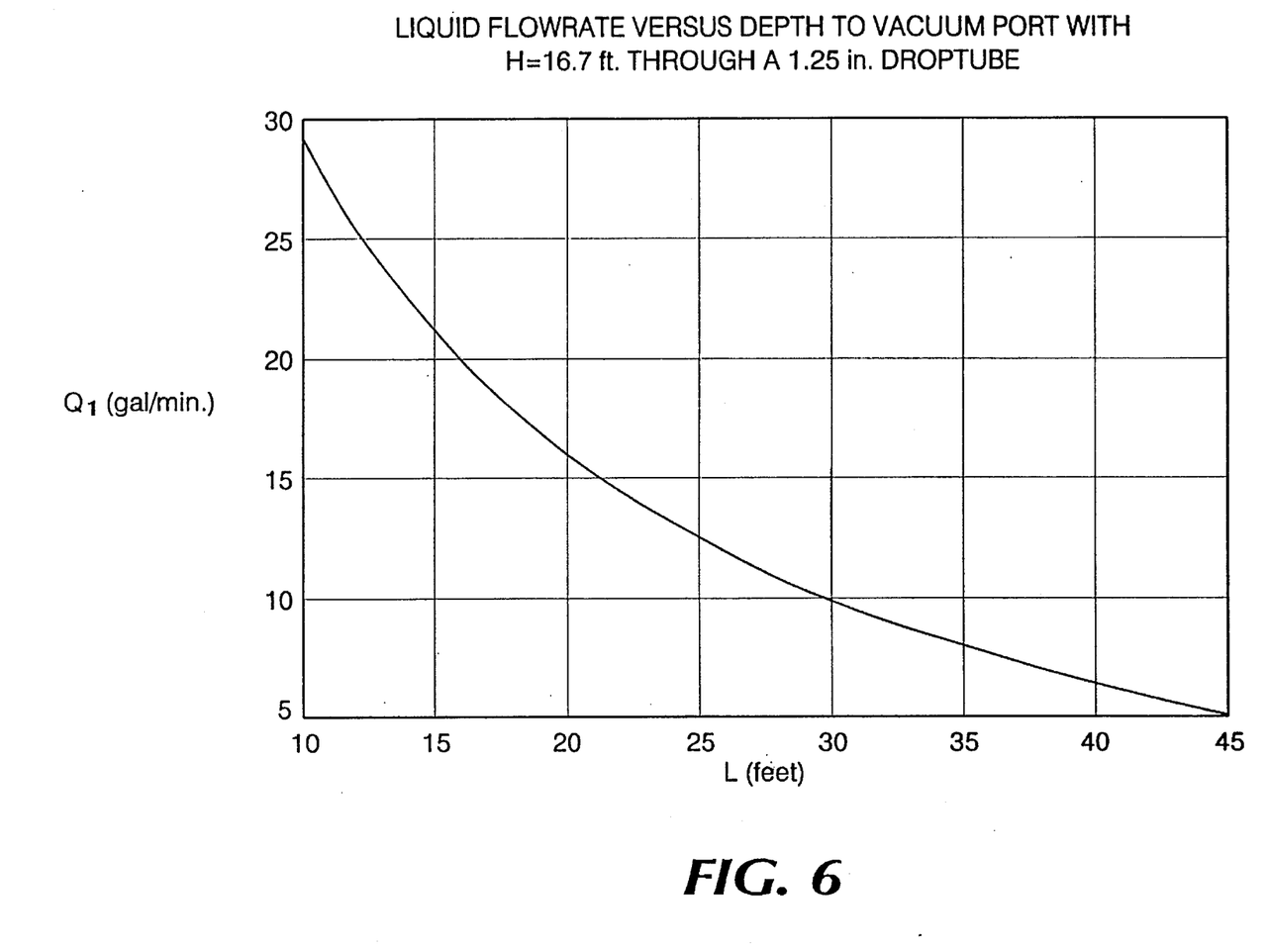
FIG. 6 is a graph of $Q_l$ versus L for a constant $Q_g$.

In a similar manner, it is preferred to provide a graph (FIG. 6) showing $Q_1$ versus L for a constant $Q_g$, wherein the value of $Q_g$ is that which is obtained from the graph of FIG. 5. For example, at $Q_1=6.5$ gal/min, FIG. 6 shows a value for L of about 35 feet, which is the distance from the aperture 48 of the centerline of the flow at the upper end of the drop-tube 24. As explained above, this value of L may be used to generate a new graph of $Q_1$ versus $Q_g$, which in turn may be used to generate a new graph of $Q_1$ versus L. However, as explained previously, it is typically acceptable to position the aperture just slightly above the liquid level in the annular area. In addition, it has been observed that an aperture diameter of about one-half inch will provide suitable results under the conditions described, wherein the drop-tube has a diameter of about 1.25 inches and the vacuum is applied at a rate of about 17 feet of water.

Once the dimension and position of the aperture has been determined and the well has been completed with the aperture so located, the removal of liquids from the formation may be initiated by simply providing power to the vacuum pump 26. In this regard it is noted that the present invention avoids the need for priming of the well to achieve a substantially continuous flow of liquid from the well. For example, prior art techniques for deep recovery (i.e. recovery from greater than about 33 feet) require that the well be primed before the well is capable of producing liquids. However, the present invention avoids the need to prime the well by providing a system which is self-priming and which does not require a special priming step and its associated equipment. In addition, the present invention enables the removal of liquids from a formation from depths above or below 33 feet with reduced vacuum requirements.

Figure 7:
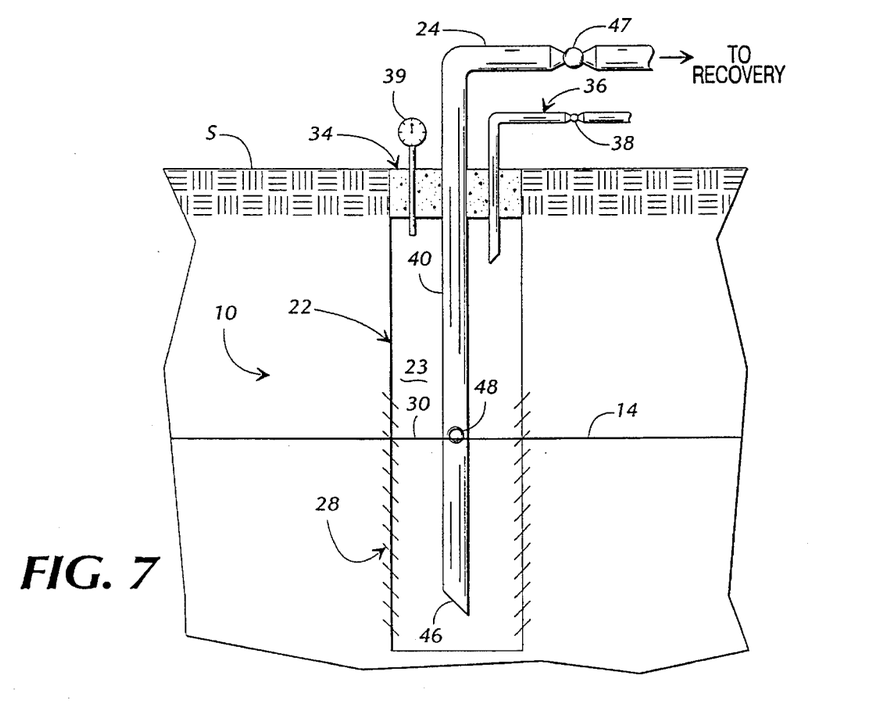
FIG. 7 is a diagrammatic view of the system of FIG. 1 prior to application of a vacuum to the tube in a typical installation.

With reference now to FIG. 7, there is shown the system of the present invention installed in the formation 10 prior to application of a vacuum to the drop tube. As can be seen, the aperture 48 is positioned above the opening 46 of the drop-tube 24 when the opening 46 positioned adjacent the water table, and the liquid level 30 is substantially the same as the water table 14.

Figure 8:
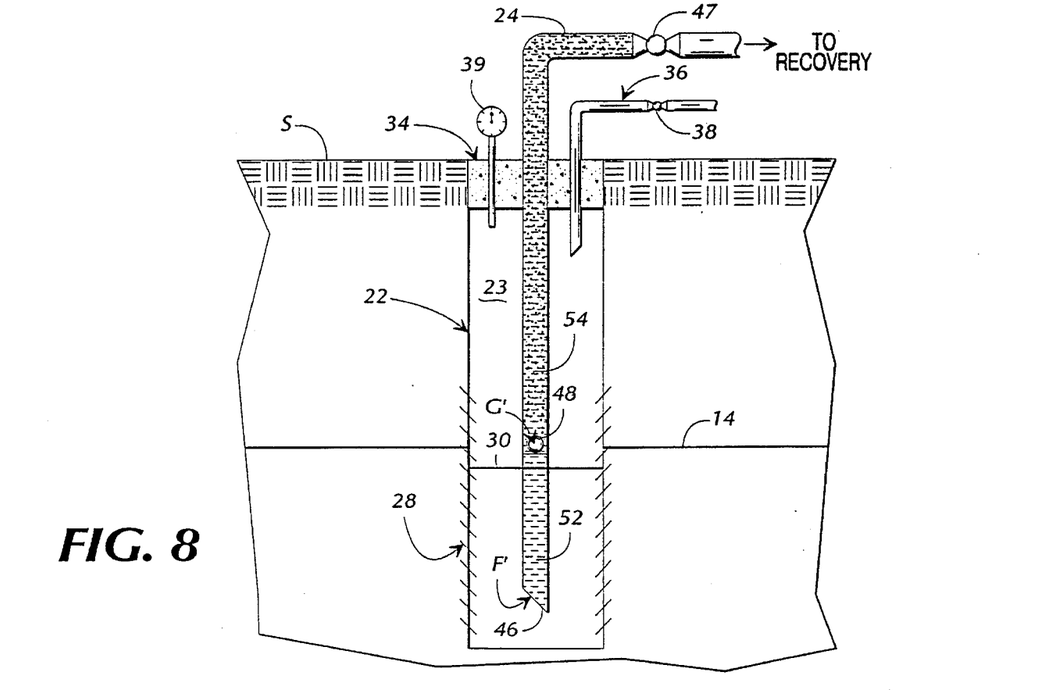
FIG. 8 is a diagrammatic view of the system of FIG. 7 after vacuum has been applied by the vacuum pump to induce a flow of liquid from the annular area into the drop-tube.

Turning now to FIG. 8, the system is shown shortly after vacuum has been applied by the vacuum pump to induce a flow of liquid F' from the annular area 23 into the drop-tube 24 through the opening. This flow of liquid establishes a flowing column of liquid 52 up the drop-tube 24 toward the upper end of the drop-tube and the liquid level 30 decreases as a function of the flow of liquid into the opening minus any influx of liquid into the annular area from the formation. For the purpose of this example, the flow of liquid into the opening 46 will be assumed to be greater than the rate at which liquid enters the annular area from the formation so that the liquid level will drop during initial operation of the system as described more fully below.

As the column of liquid 52 flows past the aperture 48, it encounters and becomes mixed with a flow of gas G' entering the drop-tube 24 through the aperture 48 from the annular area 23. The flow of gas G' results from the pressure differential between the annular area 23 and the interior of the drop-tube 24. This provides a gas/liquid column 54 in the drop-tube 24 which flows upwardly from adjacent the location of the aperture 48 up to the upper end. The gas/liquid column 54 is of a substantially reduced density as compared to the density of the liquid column 52 flowing up the drop-tube 24 from the opening 46 in the lower end of the drop-tube so that less work is required to raise liquid to the surface through the drop-tube. In addition, the gases expand as they rise and this is believed to impart momentum to the rising column of fluid to further reduce the work required to raise fluid to the surface. This is advantageous to enable initial establishment of a substantially continuous flow of liquid from the formation through the drop-tube 24 without the need for priming the well 20, and to enable withdrawal of liquid from the formation with reduced vacuum as compared to conventional vacuum extraction wells.

Figure 9:
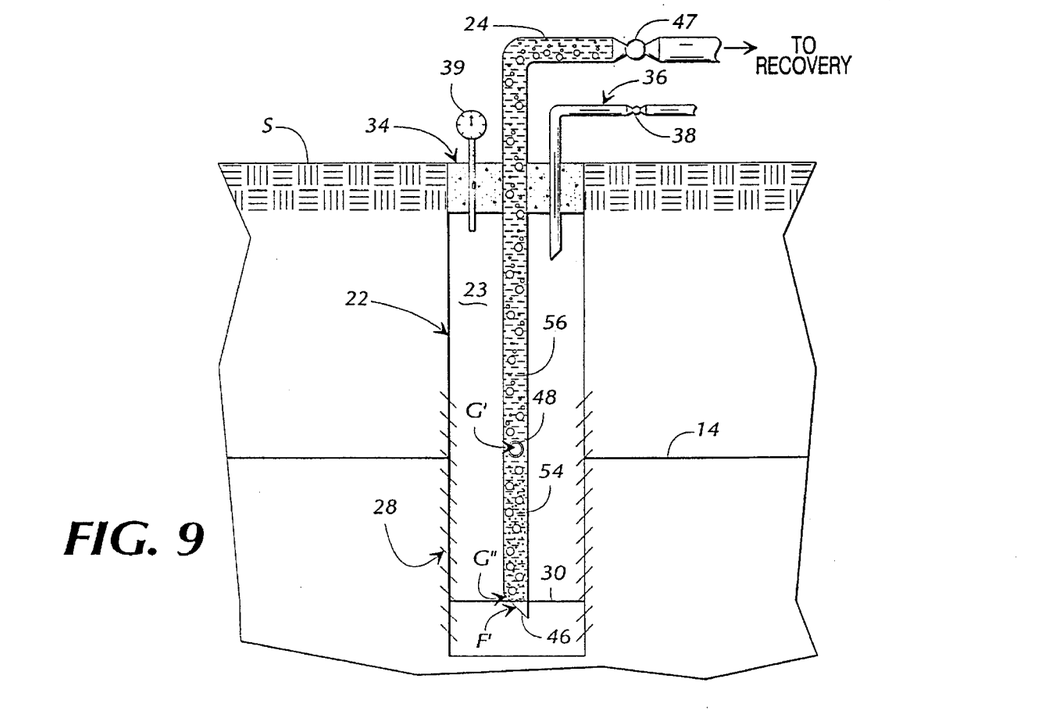
FIG. 9 is a diagrammatic view of the system of FIG. 7 operating under steady-state conditions wherein the liquid level in the annular area is adjacent the opening in the lower end of the drop-tube.

With reference now to FIG. 9, the system is shown at a time subsequent to the stage of operation shown in FIG. 8 when the system is operating under steady-state conditions. As can be seen, the liquid level 30 has dropped to a level which corresponds to the level of the opening 40 and both liquid F" and gas G" enters the drop-tube 24 through the opening 46. This mode of operation is believed to provide optimum benefits from the system in terms of maximizing the removal capacity for a given vacuum pump. For example, because both liquid and gas enter the drop-tube 24 through the opening 40, the resulting upward flow of fluid 56 through the drop-tube has a density which is less than that which would result from a flow of liquid only. The density of the flow of fluid 56 is then further reduced by the flow of gas G' which will enter the tube 24 through the aperture 44 in the manner described above to provide a flow of fluid 58 of even further reduced density.

The gas/liquid mixture pulled to the surface by the vacuum pump 26 may be treated as at 60 by conventional methods and apparatus to remove the offending compounds preferably enabling return of the groundwater to the aquifer in accordance with applicable EPA regulations. Preferably, the surface treatment includes separation of condensables; e.g. water and non-volatile hydrocarbons as by a knockout-pot or other suitable apparatus wherein separate liquid and gaseous streams are isolated for treatment. The liquid stream containing condensed hydrocarbons may be treated by any of the known techniques; e.g., adsorption with activated carbon or phase separation. The gaseous stream may be treated by scrubbing wherein gaseous organics are extracted from the gas in a scrubbing liquor or by incineration methods. It is desirable in any event to treat the separate gas and liquid streams sufficiently to enable release of the treated gas to the atmosphere and return of the treated liquid stream to the aquifer. A particularly preferred system for treatment of the gas/liquid mixture is disclosed in U.S. patent application Ser. No. 08/110442 filed on Aug. 23, 1993, under the title "System For Treating A Subterranean Formation Having An Aquifer Contaminated with Organics", which is assigned to the Assignee herein and the disclosure of which is incorporated herein by reference.

Accordingly, the present invention will be understood to enable improved removal of formation liquids in a manner which helps to avoid disadvantageous aspects of prior art methods and which provides improved results as compared to prior art methods.

The foregoing description of certain embodiments of the present invention has been provided for purposes of illustration only, and it is understood that numerous modifications or alterations may be made without departing from the spirit and scope of the invention as defined in the following claims. The embodiments described herein are the best mode known to applicant for practicing the invention, but it will be understood that other ways of treating the formation according to the claims are encompassed by the invention.

What is claimed is:

1. A vacuum well for removing fluids from a subterranean formation having an aquifer contaminated by the presence of organic compounds in fluids therein, said aquifer including a water table spaced below the ground surface and a vadose zone extending between the water table and the ground surface and having gases therein, said well comprising:

a well casing extending downwardly from the ground surface to a location below the water table;

a plurality of perforations extending through said well casing, said perforations being permeable to liquids and gases present in the formation and being positioned so that at least an appreciable number of said perforations are above the water table such that said perforations bridge between the portion of the formation containing the water table and the vadose zone so that liquids from the water table and gases from the vadose zone may enter said casing by means of flow into the casing through the perforations to establish a liquid level within the casing with the area above the liquid level in the casing being occupied by gas entering the casing through the perforations located above the water table;

an elongate drop-tube positioned within the well casing to define an elongate annular area between the well casing and the drop-tube for containing liquids and gases which pass through the perforations of the well casing, said drop tube having an upper end adjacent the ground surface and a lower end within said casing and spaced from said upper end by a substantially continuous cylindrical wall which is substantially impermeable to fluid flow therethrough, said lower end of said tube including an opening positioned adjacent the liquid level and in fluid flow communication with liquids in the annular area;

vacuum means in flow communication with the upper end of said tube for supplying a vacuum through said tube to the lower end of said tube for inducing a flow of fluid from the annular area into said drop-tube through said opening wherein said flow establishes a flowing column of fluid up said tube toward the upper end; and at least one aperture in said wall of said drop-tube to provide flow communication between the tube and fluid in said annular area, said aperture being dimensioned and spaced above said opening in the lower end of said drop-tube to provide a flow of gas from said annular area into said tube to mix gas with the column of fluid flowing up said drop-tube from said opening to provide a gas/liquid column in the tube flowing upwardly from adjacent the location of the aperture up to said upper end, wherein said flowing gas/liquid column is of a substantially reduced density as compared to the density of said flowing fluid column flowing up said drop-tube from said opening in the lower end of said drop-tube to enable the establishment of a substantially continuous flow of fluid from the formation through said drop-tube to said upper end thereof without the need for priming the well and to enable withdrawal of liquid from the formation with reduced vacuum as compared to conventional vacuum extraction wells.

2. The well of claim 1, wherein the aperture is closely adjacent the water level in the annular area prior to application of a vacuum to the well.

3. The well of claim 1, wherein the aperture is spaced above the water level in the annular area.

4. The well of claim 1, further comprising means releasably sealing said annular area from flow communication with the atmosphere above the ground surface and a vacuum relief valve which opens at a preselected setting to provide a flow of gas into the annular area to avoid an increase in the vacuum in the annular area above the preselected setting.

5. The well of claim 1, wherein said drop-tube has a diameter of about 1.25 inches, said vacuum means comprises a vacuum pump providing a vacuum of about 17 feet of water and said aperture comprises a circular aperture spaced between about 30 and 40 feet from the upper end of the tube and having a diameter of between about 0.1 and ½ inch.

6. The well of claim 1 wherein said continuous flow of fluid comprises a flow of a gas/liquid mixture.

* * * * *